(12) United States Patent
Naganuma (10) Patent No.: US 7,513,701 B2
(45) Date of Patent: Apr. 7, 2009

(54) IMAGING APPARATUS AND LIGHT QUANTITY REGULATING DEVICE USED THEREIN

(75) Inventor: Hiroaki Naganuma, Kofu (JP)

(73) Assignee: Nisca Corporation, Minamikoma-gun, Yamanashi-ken (JP)

( * ) Notice: Subject to any disclaimer, the term of this patent is extended or adjusted under 35 U.S.C. 154(b) by 989 days.

(21) Appl. No.: 10/878,515

(22) Filed: Jun. 29, 2004

(65) Prior Publication Data

US 2005/0195315 A1   Sep. 8, 2005

(30) Foreign Application Priority Data

Mar. 5, 2004   (JP)   ............... 2004-061846

(51) Int. Cl.
*G03B 9/08*   (2006.01)
*H04N 5/238*   (2006.01)

(52) U.S. Cl. .................. 396/454; 396/453; 348/367

(58) Field of Classification Search ......... 348/374–375; 396/505–510, 452–502, 496
See application file for complete search history.

(56) References Cited

U.S. PATENT DOCUMENTS

| | | | | |
|---|---|---|---|---|
| 1,771,591 A | * | 7/1930 | Strong | ............ 352/133 |
| 3,514,191 A | * | 5/1970 | Hoskin | ............ 359/230 |
| 6,554,502 B2 | * | 4/2003 | Naganuma | ............ 396/454 |
| 7,164,445 B2 | * | 1/2007 | Kijima et al. | ............ 348/314 |
| 2001/0045516 A1 | * | 11/2001 | Emanuel et al. | ............ 250/332 |
| 2002/0006285 A1 | * | 1/2002 | Takahashi | ............ 396/484 |
| 2005/0063696 A1 | * | 3/2005 | Finizio et al. | ............ 396/427 |

FOREIGN PATENT DOCUMENTS

JP   10-221740   * 2/1997

OTHER PUBLICATIONS

English translation of 10-221740 Pub Date: Aug. 21, 1998.*

* cited by examiner

*Primary Examiner*—Lin Ye
*Assistant Examiner*—Euel K Cowan
(74) *Attorney, Agent, or Firm*—Manabu Kanesaka

(57) ABSTRACT

An imaging apparatus includes an imaging optical unit for focusing light on an image-forming plane; a solid-state image pickup unit for photo-electrically converting light; a data transfer unit for controlling transfer of image data; a substrate disposed in an imaging optical path of the imaging optical unit and provided with an exposure aperture; a shutter blade for closing the exposure aperture at a closed position and opening the exposure aperture at an open position; a shutter driving unit having an exciting coil for driving the shutter blade between the closed position and the open position; and a control unit for controlling the shutter driving unit. A blade restriction member is provided for restricting a motion of the shutter blade at the closed position. A shutter blade holding unit is provided for holding the shutter blade at the open position when no driving current is supplied to the exciting coil.

2 Claims, 6 Drawing Sheets

IMAGING APPARATUS AND LIGHT QUANTITY REGULATING DEVICE USED THEREIN

BACKGROUND OF THE INVENTION AND RELATED ART STATEMENT

The present invention relates to an imaging apparatus, in which a lens focuses light from a subject on a solid-state image pickup device to form an image and electrical charges in the solid-state image pickup device are outputted to electrically obtain the image of the subject, and to a light quantity regulating device for mechanically regulating a quantity of light in the imaging apparatus.

Generally, an imaging apparatus, widely known as a video camera and a digital camera, forms an image of a subject on a solid-state image pickup device such as a CCD for obtaining an image data converted photo-electrically in the image pickup device. Recently, a cell phone with a built-in camera has been widely used. Similar to a silver camera (film-based camera), such an imaging device has an image-forming lens equipped to an imaging lens-barrel for focusing light from a subject on a predetermined image-forming plane, and the solid-state image pickup device, such as a CCD, is provided on the image-forming plane. Also, a light quantity regulating device, such as an iris device and a shutter device, is incorporated in the imaging lens-barrel for regulating a quantity of light in the image pickup device.

There has been a need to make such an imaging apparatus, in particular the imaging lens-barrel, small for reducing a size of a camera apparatus or for incorporating the imaging apparatus into a cell phone or the like, thereby further reducing a size, weight and cost. Conventionally, the light quantity regulating device, such as a shutter device and iris device, is controlled such that a shutter blade remains closed while the camera apparatus is not in use, so that light does not reach the imaging plane. In the case of the silver camera, such a structure prevents film exposure while no shooting is executed, and in the case of the solid-state image pickup device, such a structure prevents intense light, such as sunlight, from entering the image pickup device.

That is, in the digital camera as well as the silver camera, the light quantity regulating device, such as a shutter, is controlled to stay in a so-called normal closed state for blocking light while the apparatus is not in use. Such a light quantity regulating device with a normal closed control has been disclosed in, for example, Japanese Patent (Kokai) No. 3205714. In the quantity regulating device, a shutter blade and an iris blade are separately incorporated in a base board and disposed in an imaging lens-barrel. An electromagnetic driving device is linked to the blade members. The shutter blade remains closed while the apparatus is not in use, that is, power of a driving device is turned OFF.

When the light quantity regulating device of the normal closed control type is applied to a digital camera with a solid-state image pickup device, as disclosed in Japanese Patent No. 3205714, the shutter blade in the closed state is driven to switch to an open state when the apparatus is turned on. When a user pushes a shutter button (release button) after monitoring an image for shooting, electric charges in the solid-state image pickup device are released (electrical reset) to start an exposure. After a predetermined exposure time, a current is supplied to the shutter driving device to move the shutter blade to a closed position. In the digital camera with the solid-state image pickup device, different from a silver camera, the shutter is held opened for a considerable time for the monitoring before the shooting. Accordingly, power is kept supplied to the driving portion of the light quantity regulating device, such as a shutter, thereby consuming extra power.

In order to solve the problem, in Japanese Patent No. 3205714, a driving device is formed of a magnet rotor and an exciting coil wound around the periphery of the rotor. Further, an attraction member made of a soft magnetic material is provided for holding the magnet rotor at an actuated position (closed position of the shutter) and a non-actuated position of the blade. Specifically, a pin made of a soft magnetic material is provided at just outside of a moving range of the magnet rotor, and a magnetic pole of the magnet rotor is attracted to the pin, so that the blade member is held at the open position or the closed position without a driving current.

In the conventional imaging apparatus with the solid-state image pickup device described above, when the shutter blade controls the exposure, the blade member stays at the closed position when the apparatus is not in use and moves to the open position when the apparatus is turned on. In this case, it is necessary to supply power to the driving device of the blade during the monitoring for relatively a long time, thereby wasting power. In order to eliminate this problem, in Japanese Patent No. 3205714, the light quantity regulating device is provided with a hold mechanism for holding the blade member at the open position after moving from the closed position. With the hold mechanism, it is not necessary to supply power to the driving device during the monitoring. However, it is necessary to provide the hold mechanisms at the open position and the closed position of the blade member separately. The hold mechanism includes a mechanical latch structure or a magnetic attraction structure disclosed in Japanese Patent No. 3205714.

When the pin members made of a soft magnetic material or the like are provided separately at the open position and the closed position of the blade for creating magnetic attraction, an exciting coil for inducing a driving force tends to have a small winding area, thereby increasing an outer shape of the apparatus for providing the winding area of the coil, and making it difficult to make the apparatus small. Further, when the charges in the solid-state image pickup device are successively transferred to outside after the blade member is closed, in the magnetic attraction mechanism for holding the blade at the closed position, the blade may rebound due to an impact at the attraction or sway toward the open position and vibrate due to an impact when an external force is applied to the camera apparatus, thereby leaking light from outside.

Further, when the special hold mechanism holds the shutter blade at the closed position magnetically or mechanically, there is an operational lag when the blade is released from the closed position in a case of successive shooting. For example, in the case of the magnetic attraction mechanism, a driving force of the exciting coil is reduced by an attraction force of the hold mechanism. Accordingly, the blade moves from the closed position to the open position slowly, thereby interfering the successive shooting.

In order to solve the problems described above, in the present invention, a shutter blade is held at an open position (posture) while not in use, different from the conventional normal closed control in which the shutter blade member is held at the closed position while not in use.

Accordingly, an object of the invention is to provide an imaging apparatus with a small lens-barrel with light weight and capable of shooting immediately after the apparatus is turned on or during the successive shooting.

Further objects and advantages of the invention will be apparent from the following description of the invention.

SUMMARY OF THE INVENTION

In order to achieve the objects described above, according to a first aspect of the present invention, an imaging apparatus include an imaging optical unit for focusing light from a subject on a predetermined image-forming plane; a solid-state image pickup unit disposed at the image-forming plane for photo-electrically converting light from the subject; a data transfer unit for controlling transfer of image data accumulated on the solid-state image pickup unit; a substrate disposed in an imaging optical path of the imaging optical unit and provided with an exposure aperture; a shutter blade provided on the substrate for closing the exposure aperture at a closed position and opening the exposure aperture at an open position; a shutter driving unit having an exciting coil for driving the shutter blade between the closed position and the open position; and a control unit for controlling the shutter driving unit. A blade restriction member such as a stopper is provided on the substrate for restricting a motion of the shutter blade at the closed position. Further, a shutter blade holding unit is provided for holding the shutter blade at the open position when no driving current is supplied to the exciting coil. The shutter blade holding unit is formed of a magnetic or urging spring for constantly urging the blade in an open direction.

In the first aspect, the control unit supplies a driving current to the exciting coil according to a predetermined exposure timing signal, so that the shutter blade moves from the open position to the closed position. While the data transfer unit is outputting the image data, the control unit continues to supply the driving current to the exciting coil, thereby urging the shutter blade toward the blade restriction member. After the data transfer unit transfers the image data, the shutter blade moves from the closed position to the open position. That is, the control circuit such as a CPU starts exposure upon a release operation, and supplies the driving current to the exciting coil at a timing signal of a timer after a predetermined time to close the shutter blade. The control unit continues to supply the driving current to the exciting coil until the solid-state image pickup device such as a CCD completely transfers the imaging data. The time duration is set in advance by the CPU. Accordingly, the shutter blade is held at the open position all the time (when no current flows through the driving unit).

According to a second aspect of the present invention, an imaging apparatus includes an imaging optical unit for focusing light from a subject on a predetermined image-forming plane; a solid-state image pickup unit disposed at the image-forming plane for photo-electrically converting light from the subject; a data transfer unit for controlling transfer of image data accumulated in the solid-state image pickup unit; a substrate disposed in an imaging optical path of the imaging optical unit and provided with an exposure aperture; a shutter blade provided on the substrate for closing the exposure aperture at a closed position and opening the exposure aperture at an open position; a shutter driving unit having an exciting coil for driving the shutter blade between the closed position and the open position; an iris blade provided on the substrate and having an iris aperture smaller than a diameter of the exposure aperture; and an iris driving unit having an exciting coil for driving the iris blade between an actuated position entering the exposure aperture and a non-actuated position retracted from the exposure aperture. An iris blade restriction member is provided on the substrate for restrict a motion of the iris blade at the actuated position, while the shutter blade has a structure same as in the first aspect. The iris blade restriction member can be formed of a stopper mechanism, such as a pin or a protrusion.

A driving current is supplied to the exciting coil according to an iris actuation signal, thereby moving the iris blade from the non-actuated position to the actuated position. While the data transfer unit is outputting the image data, the driving current is continued to flow to the exciting coil, thereby urging the iris blade toward the iris blade restriction member. After the data transfer unit completely transfers the image data, the iris blade moves from the actuated position to the non-actuated position. The CPU sends the iris actuation signal to the driving (control) circuit in the driving unit according to the control circuit determining whether a shooting is executed in a slightly reduced aperture or fully opened aperture depending on an exposure condition. The data transfer unit is incorporated in the control circuit in the solid-state image pick-up device such as a CCD, and transfers the charges accumulated through successively scanning photo-electric transfer elements corresponding to pixels per a reference clock. Accordingly, when the apparatus is in a non-conductive state, the shutter blade is held at the open position and the iris blade is held at the retracted position. In particular, when the subject is monitored on a liquid crystal display apparatus or the like, since the shutter blade is held at the open position and the iris blade member is held at the retracted position in a non-conductive state, it is possible to monitor the subject on a bright screen without consuming power.

According to a third aspect of the present invention, in the configuration according to the first or second aspect, the exposure aperture has a diameter of 4 mm or less. When the apparatus is in a non-conductive state (not in use), it is possible to minimize light entering the solid-state image pickup device, thereby preventing light from reaching the solid-state image pickup device.

According to a fourth aspect of the present invention, in the configuration according to the first or second aspect, the shutter blade holding unit is formed of a spring unit or a magnetic attraction unit for urging the shutter blade against the blade restriction member. Accordingly, it is possible to securely hold the shutter blade member at the open position even when power of the apparatus is OFF. In addition, it is not necessary to move the blade for monitoring when the apparatus is turned on, thereby enabling quick shooting.

According to a fifth aspect of the present invention, in the configuration according to the first or second aspect, the iris blade holding unit is formed of a spring unit or a magnetic attraction unit for urging the iris blade against the iris blade restriction member. Accordingly, an advantage same as that in the fourth aspect can be achieved.

According to a sixth aspect of the present invention, the iris blade has an iris aperture smaller than a diameter of the exposure aperture formed in the substrate, and an ND filter is provided to the iris aperture. Accordingly, the ND filter reduces light passing through the exposure aperture, so that the exposure aperture can be made larger, thereby reducing an interference pattern due to a small aperture and obtaining a high quality image.

According to a seventh aspect of the present invention, the ND filter is attached with reference to a positioning hole formed in the iris blade. Accordingly, when the ND filter is attached, the ND filter does not shift, thereby obtaining an adequate image.

According to an eighth aspect of the present invention, the substrate includes a partition board disposed between an iris blade member and a shutter blade member and formed of a material same as that of the shutter blade, thereby reducing material cost.

According to a ninth aspect of the present invention, the substrate is provided with a supporting axis for supporting the shutter blade to be rotatable at one side of the exposure aperture and another supporting axis for supporting the iris blade to be rotatable at the other side. The substrate also has a retraction region for holding the shutter blade and the iris blade in a superposed posture at a position away from the exposure aperture, thereby making the substrate small.

According to a tenth aspect of the present invention, a light quantity regulating device includes a substrate having an exposure aperture with a diameter of 4 mm or less; a shutter blade provided on the substrate for closing the exposure aperture at a closed position and opening the exposure aperture at an open position; a shutter driving unit having an exciting coil for driving the shutter blade between the closed position and the open position; and a control unit for controlling the shutter driving unit. A blade restriction member is provided on the substrate for restricting a motion of the shutter blade at the closed position, and a shutter blade holding unit is provided on the substrate for holding the shutter blade at the open position while no driving current is supplied to the exciting coil.

In the tenth aspect, the control unit supplies a driving current to the exciting coil according to a predetermined exposure timing signal, so that the shutter blade moves from the open position to the closed position. The control unit continues to supply the driving current to the exciting coil for a predetermined time set in advance, thereby urging the shutter blade toward the shutter blade restriction member. After the predetermined time, the shutter blade moves from the closed position to the open position, thereby obtaining an advantage same as that in the first aspect.

According to an eleventh aspect of the present invention, a light quantity regulating device includes a substrate having an exposure aperture with a diameter of 4 mm or less; a shutter blade provided on the substrate for closing the exposure aperture at a closed position and opening the exposure aperture at an open position; a shutter driving unit having an exciting coil for driving the shutter blade between the closed position and the open position; an iris blade provided on the substrate and having an iris aperture smaller than a diameter of the exposure aperture; and an iris driving unit having an exciting coil for driving the iris blade between an actuated position entering the exposure aperture and a non-actuated position retracted from the exposure aperture. A shutter blade restriction member is provided on the substrate for restricting a motion of the shutter blade at the closed position, and an iris blade restriction member is provided on the substrate for restricting a motion of the iris blade at the actuated position.

In the eleventh aspect, the control unit supplies a driving current to the exciting coil according to a predetermined exposure timing signal, so that the shutter blade moves from the open position to the closed position. The control unit continues to supply the driving current to the exciting coil for a predetermined time set in advance, thereby urging the shutter blade toward the blade restriction member. After the predetermined time, the shutter blade moves from the closed position to the open position. The iris driving unit supplies a driving current to the exciting coil according to an iris actuation signal, so that the iris blade moves from the non-actuated position to the actuated position. The iris driving unit continues to supply the driving current to the exciting coil for a predetermined time set in advance, thereby urging the iris blade toward the iris blade restriction member. After the predetermined time, the iris blade moves from the closed position to the open position. A blade holding unit is provided for holding the shutter blade at the open position and the iris blade at the non-actuated position while no current flows through the exciting coil, thereby obtaining an advantage same as that in the second aspect.

DETAILED DESCRIPTION OF PREFERRED EMBODIMENTS

Figure 1:
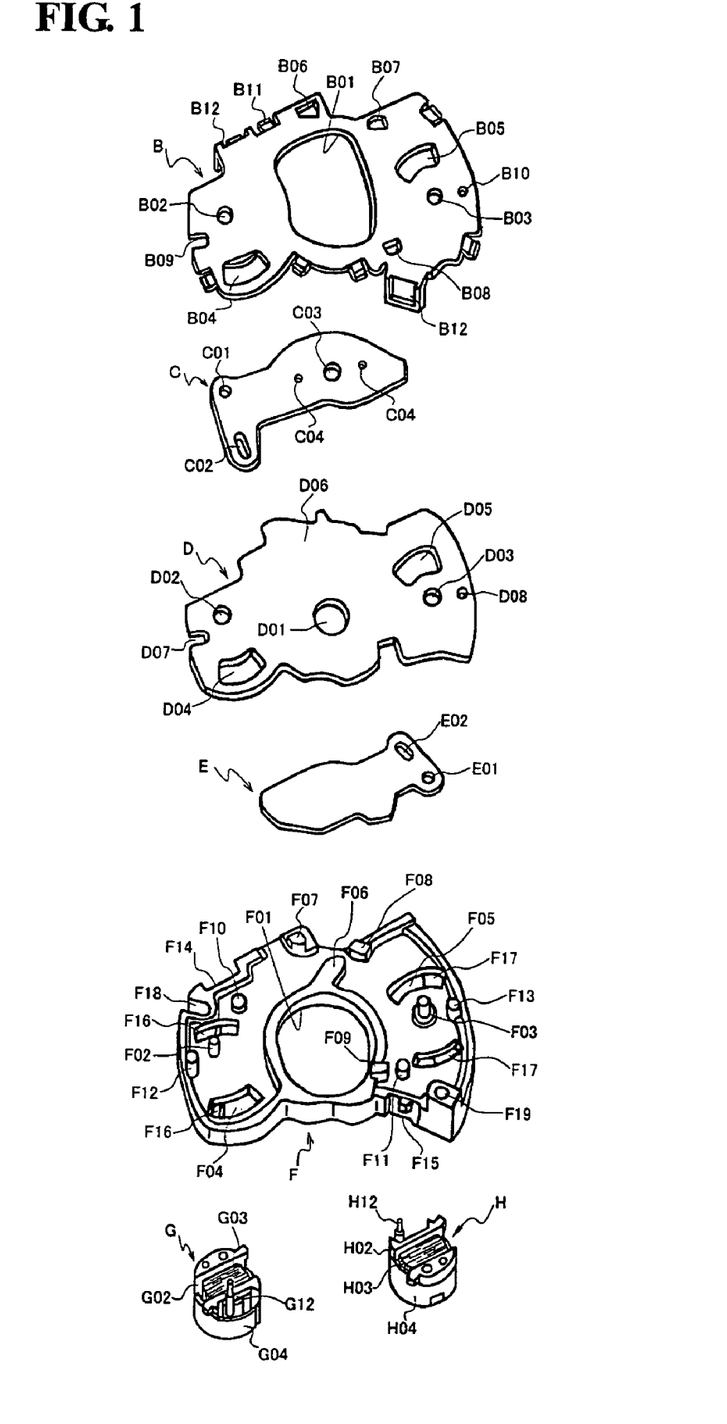
FIG. 1 is an exploded perspective view of an imaging apparatus according to an embodiment of the invention.
Figure 2A:
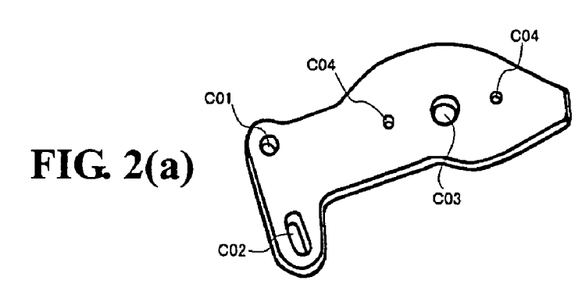
FIGS. 2(a) to 2(d) are perspective views showing various iris blade members to be incorporated in the imaging apparatus shown in FIG. 1.
Figure 2B:
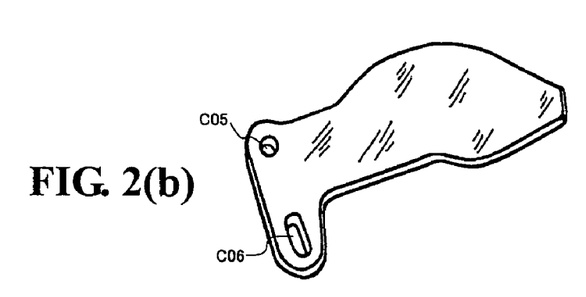
Figure 2C:
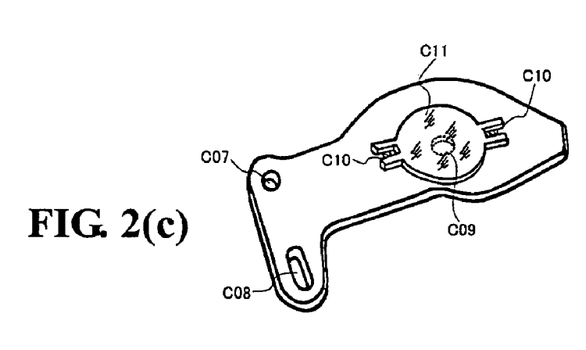
Figure 2D:
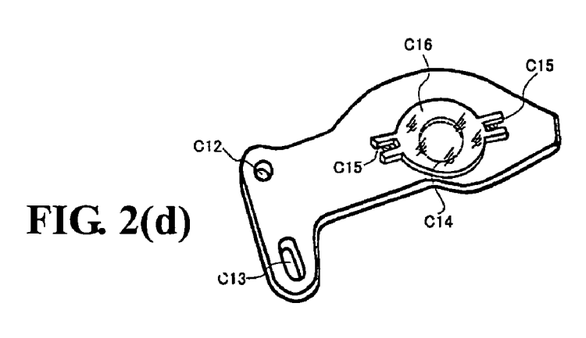
Figure 3A:
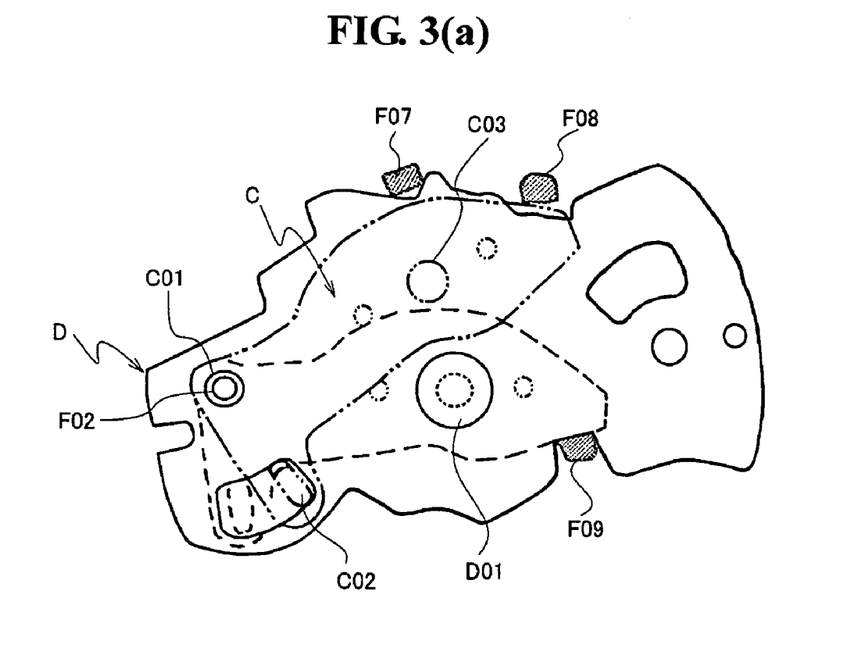
FIGS. 3(a) and 3(b) are schematic views showing an operation of the iris blade member and a shutter blade member in the imaging apparatus shown in FIG. 1.
Figure 3B:
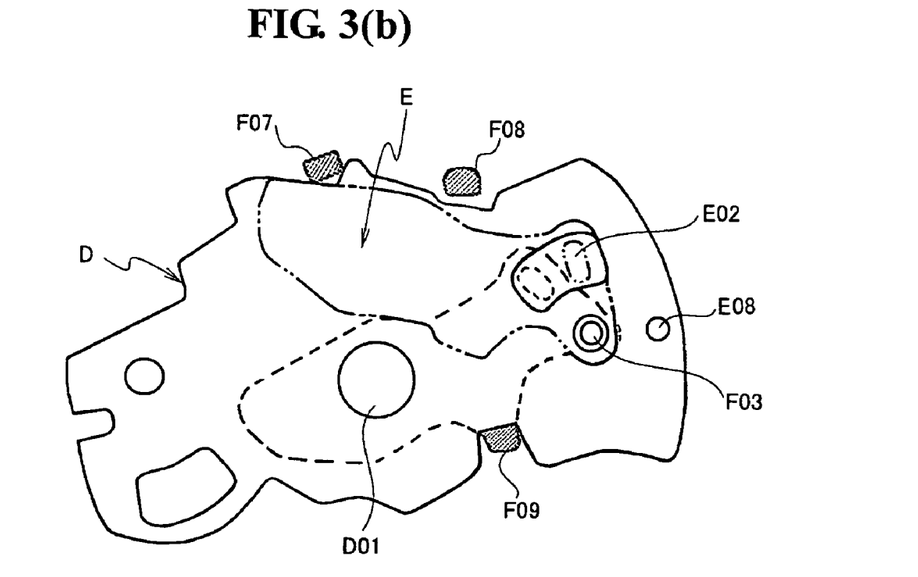
Figure 4:
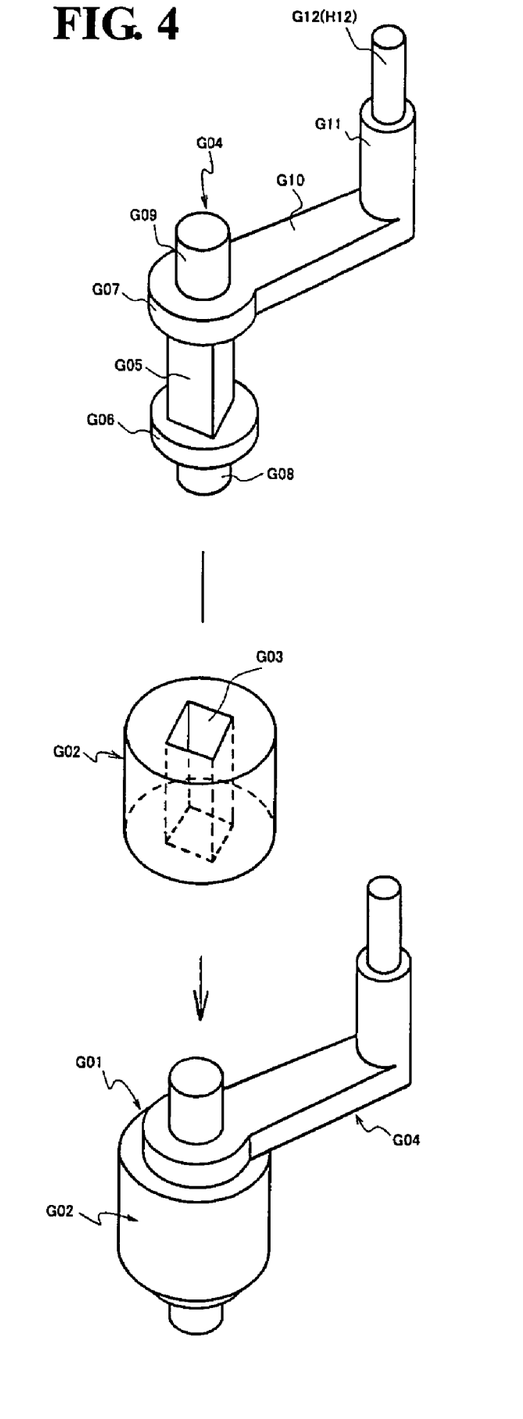
FIG. 4 is an exploded perspective view showing a magnet rotor of an iris blade driving member and a shutter blade driving member for respectively driving the iris blade member and the shutter blade member in the imaging apparatus shown in FIG. 1.
Figure 5:
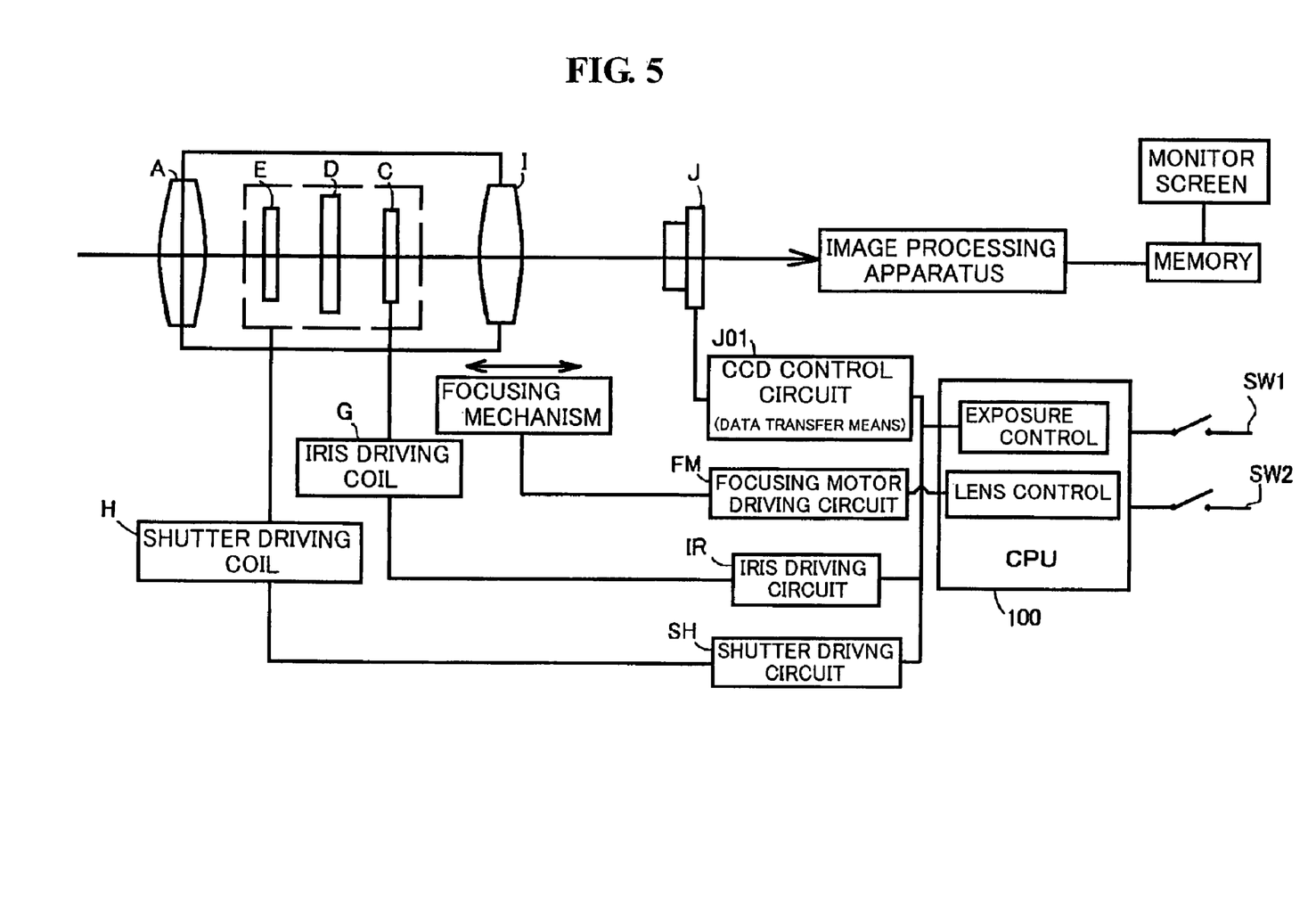
FIG. 5 is a block diagram showing a control system of the imaging apparatus.
Figure 6:
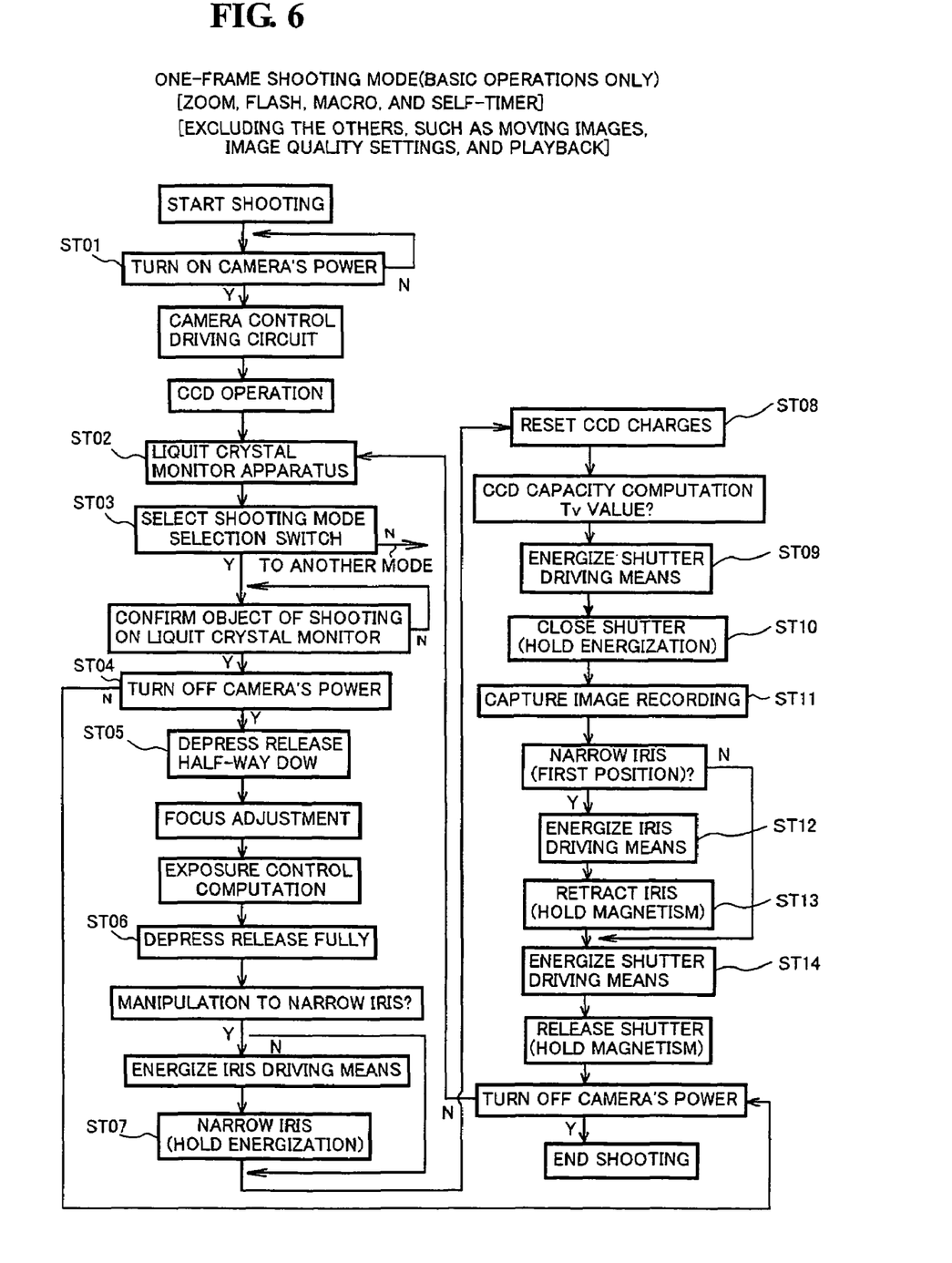
FIG. 6 is a flow chart showing an operation of the imaging apparatus shown in FIG. 1 during a one-frame shooting.

Hereunder, embodiments of the present invention will be described with reference to the accompanying drawings. FIG. 1 is an exploded perspective view showing a light quantity regulating device to be incorporated in an imaging apparatus according to an embodiment of the invention. FIGS. 2(a) through 2(d) are perspective views showing various iris blade members to be incorporated in the imaging apparatus. FIG. 3(a) and FIG. 3(b) are schematic views showing an operation of the iris blade member and a shutter blade member in the imaging apparatus shown in FIG. 1. FIG. 4 is an exploded perspective view showing a magnet rotor of an iris blade driving member and a shutter blade driving member for respectively driving the iris blade member and the shutter blade member in the imaging apparatus shown in FIG. 1. FIG. 5 is a block diagram showing a control system of the imaging apparatus. FIG. 6 is a flow chart showing an operation of the imaging apparatus shown in FIG. 1 during a one-frame shooting.

First, the light quantity regulating device according to the embodiment of the invention will be described. As shown in FIG. 1, the light quantity regulating device is formed as a unit, in which a shutter blade member E and an iris blade member C are incorporated on a device substrate F (hereinafter, referred to as a bottom board). D denotes an intermediate board (partition board) for separating a driving unit H (driving means) of the shutter blade member E and the iris blade member C, and B denotes a pressing board. The light quantity regulating device comprises components specified below, and is incorporated in an image-forming lens of the imaging apparatus as described below.

The bottom board F is a molded piece made of a resin or the like, and is formed in an adequate shape for attaching and supporting the shutter blade member E, the iris blade member C, and the driving units (driving means) H and G for driving the respective blade members to open and close. The bottom board F is provided with an aperture F01 aligned on an imaging optical axis, and the aperture F01 has a size larger than a diameter of an exposure aperture D01 provided in an intermediate board D described below. A pin-shaped iris blade supporting axis F02 and a shutter blade supporting axis F03 are formed integrally with the bottom board F for supporting the shutter blade member E and the iris blade member C to be rotatable, respectively. The shutter blade E is first incorporated into the bottom board F, followed by the intermediate board (partition board) D, the iris blade member C, and the pressing board B, which are superposed from bottom to top in this order.

The shutter blade member E is supported by the shutter blade supporting axis F03 to be rotatable, and guided by a guiding rib F06 formed in the bottom board F to be movable between a position to cover the aperture F01 (hereinafter, referred to as a closed position) and a position retracted from the aperture F01 (hereinafter, referred to as an open position). The shutter blade E is provided with a long hole E02 for engaging an actuation pin H12 of the shutter blade driving unit H described below. The bottom board F is provided with a long hole F05 for inserting the actuation pin H12.

The shutter blade member E properly blocks light incident from a front lens A through the exposure aperture D01 formed in the intermediate board D to be received at a solid-state image pickup device J such as a CCD, so that adequate exposure is obtained together with the iris blade member C. The shutter blade member E is a sheet formed of a material such as a polyester film and a Tetoron film with a black pigment applied or vapor deposited thereon. Referring to the drawing, E01 denotes a central hole of rotation through which the shutter blade supporting axis F03 of the bottom board F penetrates. The shutter blade member E is thus axially supported to be rotatable about the shutter blade supporting blade F03. E02 denotes an actuation slit hole through which the actuation pin H12 of the shutter blade driving unit H penetrates. The shutter blade member E rotates about the central hole of rotation E01.

Stoppers F08 and F09 are formed integrally with the bottom board F and protrude for restricting motions of the shutter blade member E supported to open and close. The shutter blade member E abuts against the stopper F09 at the closed position and the stopper F08 at the open position not to rotate beyond these positions. The stoppers F08 and F09 thus serve as restriction members for restricting the motion of the shutter blade member E.

The shutter blade member E is supported by the bottom board F to open and close, and is covered by the intermediate board (partition board) D. The intermediate board D is supported by protrusions F10 and F11 formed integrally with the bottom board F, and a gap is thereby formed between the bottom board F and the intermediate board D for the shutter blade member E to rotate therein. The shutter blade member E is formed of a resin film, and the intermediate board D is formed of a resin film made of the same material. The intermediate board D is provided with the exposure aperture D01 aligned with the aperture F01 in the bottom board F and having a diameter of 4 mm. When the shutter blade member E opens, a maximum quantity of light is guided to the solid-state image pickup device J in the imaging apparatus through the exposure aperture D01, and the diameter thereof is 4 mm or less. This is a limit value found empirically, so that even when intense light such as sunlight is sent to the image pickup device such as a CCD, exposure does not occur.

The intermediate board D is provided with a hole D02 through which the iris blade supporting axis F02 penetrates, and a hole D03 through which the shutter blade supporting axis F03 penetrates. Likewise, the intermediate board D is provided with a slit D04 through which an actuation pin G12 of the iris blade driving unit G penetrates, and a slit D05 through which the actuation pin H12 of the shutter blade driving unit H penetrates. Referring to the drawing, D06 denotes a retraction area where the iris blade member C and the shutter blade member E retract from the exposure aperture D01. The iris blade supporting axis F02 and the shutter blade supporting blade F03 as centers of rotation are provided at positions on a line with the exposure aperture D01 in between, so that the shutter blade member E and the iris blade member C enter the exposure aperture D01 and retract in the retraction area D06. Referring to the drawing, D07 denotes a positioning concave groove hole into which a pin F12 formed in the bottom board F is fit, and D08 denotes a positioning hole into which a pin F13 of the bottom board F is fit.

The iris blade member C will be described next. The iris blade member C regulates a quantity of subject light incident on the front lens A of the imaging apparatus and reaching the solid-state image pickup device J through the exposure aperture D01 in the intermediate board D. The iris blade member C is formed from a resin film through die cutting, and is provided with an iris aperture C03 having a size smaller than the diameter of the exposure aperture D01 in the intermediate board D; a central hole of rotation C01 for engaging the iris blade supporting axis F02 formed in the bottom board F; and a slit C02 for engaging the actuation pin G12 of the iris blade driving unit G. An attachment reference hole C04 is provided in the vicinity of the iris aperture C03 for attaching an ND filter (described below with reference to FIG. 2(c) and FIG. 2(d)).

The iris blade member C in various modes will be described next. FIG. 2(a) shows the iris blade member C as described above. FIG. 2(b) shows a case where the blade itself is made of a translucent filter material. As shown in FIG. 2(a), the iris aperture C03 has a size smaller than the diameter of the exposure aperture D01 for reducing a quantity of imaging light. On the other hand, as shown in FIG. 2(b), a quantity of light is adjusted with an extent of attenuation when light from the exposure aperture D01 passes through the blade. FIG. 2(c) shows a case where an ND film made of a translucent filter material is attached to the iris aperture C03 of the blade shown in FIG. 2(a). The ND film is attached with an adhesive as an attachment reference hole C10 of the blade corresponds to a position determining concave groove formed in the filter. As shown in FIG. 2(d), an aperture C14 is aligned with the center of the exposure aperture D01, and an ND filter 16 is attached to the aperture C14. The aperture C14 has a size larger than the diameter of the exposure aperture D01.

The ND filter 16 reduces an intensity of light coming through the exposure aperture D01. Accordingly, it is not necessary to accurately manufacture the aperture C14, thereby reducing cost as compared with a case where the entire blade is made of a filter material. In addition, the central holes of rotation C01, C05, C07 and C12 for engaging the iris blade supporting axis F02 formed integrally with the bottom board F, and slits C02, C06, C08 and C13 for engaging the actuation pin G12 of the iris blade driving unit G formed integrally with the blade are formed in the blades with die cutting.

The pressing board B will be described next. The pressing board B is a metal plate formed in substantially the same shape as the bottom board F, and formed in a unit by incorporating the shutter blade member E and the iris blade member C in a space between the pressing board B and the bottom board F. The pressing board B is provided with an aperture B01 coaxially corresponding to the exposure aperture D01 and having a size larger than the diameter of the exposure aperture D01. B02 denotes a clearance hole for engaging the iris blade supporting axis F02 formed in the bottom board F, and B03 denotes a clearance hole for engaging the shutter blade supporting axis F03 formed in the bottom board F. Likewise, B04 denotes a clearance hole in which the actuation pin G12 of the iris blade driving unit G moves, and B05 denotes a clearance hole for the actuation pin H12 of the shutter blade driving unit H. B07 and B08 denote clearance holes for the stoppers F08 and F09, respectively.

Referring to the drawing, B09 and B10 denote positioning holes for engaging the pins F12 and F13 formed in the bottom board F, respectively. The engagement aligns the bottom board F and the pressing board B. The pressing board B is provided with an adequate number (six shown in the drawing) of bending portions B11 for gap adjustment to form a clearance among the bottom board F, the intermediate board D, and the pressing board B. Also, the pressing board B is provided with two stopper concave portions B12 for fitting to claws F14 and F15 formed in the bottom board F, so that the bottom board F and the pressing board B are formed as one unit (fixed to each other). Referring to the drawing, D08 denotes a positioning hole serving as a clearance hole for the intermediate board positioning pin F13 of the bottom board F to penetrate.

The iris blade driving unit G and the shutter blade driving unit H will be described next. The iris blade driving unit G is to drive the iris blade member C, as needed, to move between the retracted position at which the iris blade member C is retracted from the exposure aperture D01 in the intermediate board D and the iris position at which the iris blade member C enters the exposure aperture D01. Referring to the drawing, G02 denotes a coil frame, comprising an upper body and a lower body. The coil frame G02 supports a magnet rotor G01 to be rotatable therein, and includes a concave groove for winding an electrical conducting coil G03 at the outside. The electric conducting coil G03 is wound around the coil frame G02. G03 denotes the electric conducting coil wound around the coil frame G02 for supplying a driving current to the magnet rotor G01 as needed to rotate according to a direction of the supply.

G04 denotes a shielding yoke attached to enclose the outer periphery of the coil frame 2 around which the electric conducting coil G03 is wound while the magnet rotor G01 is axially supported inside, thereby shielding the magnet rotor G01 from an external magnetic field. The shielding yoke G04 has a C-shaped cross section partially provided with a slit notched portion. A rotational force of the rotor G01 is constantly applied to the notched portion with a crossing point of a line connecting the magnetic poles N and S of the magnet rotor G01 perpendicular to the notched portion as a stable point (neutral point).

Accordingly, the notched portion of the shielding yoke G04 forms a urging unit for constantly urging the magnet rotor G01 so that the iris blade member C is held at the retracted position when power of the apparatus is OFF. The urging unit and the stopper F08 in the bottom board F together form a holding unit for holding the iris blade member C at the retracted position. Accordingly, it is possible to constantly hold the iris blade member C at the retracted position in a reliable manner even when the power stays OFF. In the conventional counterpart, it is necessary to perform trigger of confirmation (initializing operation) each time the power is turned ON. In the embodiment, the control becomes easier because such a need is eliminated.

The urging means is formed of the shielding yoke G04 with a C-shaped cross section, and the iris blade driving unit G is formed of a magnetic material for applying a magnetic action to the magnet rotor G01 with the magnet rotor G01 as the driving unit. Accordingly, a stopper mechanism or the like can be omitted, and it is possible to control through merely blocking the driving current and turning off power. Alternatively, instead of the magnetic action, the urging unit may be formed of an urging spring for constantly acting on the iris blade driving unit G. In this case, as compared with the magnetic attraction, it is possible to securely hold the iris blade member C at the retracted position. G12 denotes an actuation pin of the magnet rotor G01 shown in FIG. 4 for fitting in the slit hole C02 in the iris blade member C.

The shutter blade driving unit H drives the shutter blade member E between the shutter open position at which the shutter blade member E is retracted from the exposure aperture D01 in the intermediate board D and the shutter closed position at which the shutter blade member E enters the exposure aperture D01. Referring to the drawing, H02 denotes a coil frame, comprising an upper body and a lower body. The coil frame H02 supports a magnet rotor H01 to be rotatable therein, and includes a concave groove for winding an electrical conducting coil H03 at the outside. The electrical conducting coil H03 is thereby wound around the coil frame H02. H03 denotes the electrical conducting coil wound around the coil frame H02 for supplying a driving current to the magnet rotor H01 to rotate as needed according to a direction of the supply. H04 denotes a shielding yoke provided with a flat portion parallel to the winding direction of the electric conducting coil H03.

The shielding yoke H04 has a C-shaped cross section, and is configured in the same manner as the shielding yoke G04 to attain the same function. The notched portion of the shielding yoke H04 thus forms an urging unit to constantly act on the magnet rotor H01 in such a manner that the shutter blade member E is held at the retracted position while the power of the apparatus stays OFF. Alternatively, it is possible to form the urging unit with an urging spring that constantly acts on the shutter blade driving unit H instead of a magnetic action. In this case, it is possible to hold the shutter blade member E constantly at the shutter open position in a reliable manner as compared with the magnetic attraction. H12 denotes an actuation pin of the magnet rotor H01 shown in FIG. 4 for fitting in the operation slit hole E02 in the shutter blade member E, thereby allowing the shutter blade member E to rotate about the central hole of rotation E01.

An operational state (opening and closing motion) of the shutter blade member E and the iris blade member C described above will be described with reference to FIG. 3(a) and FIG. 3(b). FIG. 3(a) shows an operation state of the iris blade member C with respect to the exposure aperture D01 in the intermediate board D viewed from the pressing board B shown in FIG. 1. A state indicated by a phantom line is a state that the iris blade member C abuts against the iris blade stopper F07 of the bottom board F and is located at the iris retracted position retracted from the exposure aperture D01 in the intermediate board D. A state indicated by a hidden line is a state that the iris blade member C abuts against the iris blade/shutter blade common stopper F09 of the bottom board F and is located at the iris position entering the exposure aperture D01 in the intermediate board D.

When the iris blade member C is at the iris position, the electric conducting coil G03 of the iris blade driving unit G is supplied with a current in a direction same as the driving current at the time of abutting. The abutting state is thus maintained by a driving force of the iris blade driving unit G.

Hence, the iris blade member C remains stable against an impact or the like as opposed to a magnetic action. It is possible to maintain the iris state in a reliable manner, thereby eliminating an image pattern.

FIG. 3(b) shows an operation state of the shutter blade member E with respect to the exposure aperture D01 in the intermediate board D viewed from the pressing board B shown in FIG. 1 through the intermediate board D. The state indicated by a phantom line is a state that the shutter blade member E abuts against the shutter blade stopper F08 of the bottom board F, and is located at the shutter open position retracted from the exposure aperture D01 in the intermediate board D. A state indicated by a hidden line is a state that the shutter blade member E abuts against the iris blade/shutter blade common stopper F09 of the bottom board F, and is located at the shutter closed position entering the exposure aperture D01 in the intermediate board D.

When the shutter blade member E is present at the shutter closed-position, the electric conducting coil H03 of the shutter blade driving unit H is supplied with a current in the same direction as the driving current at the time of abutting. The abutting state is thus maintained by a driving force of the shutter blade driving unit H. Hence, the shutter blade member E remains stable against an impact or the like as opposed to a magnetic action. It is thus possible to maintain the shutter closed state in a reliable manner, thereby eliminating an exposure mistake.

As described above, the light quantity regulating device is incorporated into the lens-barrel of the camera apparatus to form an imaging apparatus, for example, as shown in FIG. 5, in a space between the front lens A and the rear lens I constituting the image-forming lens, and is controlled as described below. FIG. 5 is a schematic block diagram, in which E denotes a shutter blade member, C denotes an iris blade member, G denotes an iris blade driving unit, H denotes a shutter blade driving unit, and J denotes a solid-state image pickup device such as a CCD.

The light quantity regulating device as described above is incorporated in a lens-barrel of a digital camera, a video camera, etc., and regulates a quantity of light by means of the shutter that shuts light in an imaging optical path through which light from the subject reaches the solid-state image pickup element J or the iris that increases or decreases a quantity of light. FIG. 5 is a schematic view of the imaging apparatus, in which A denotes the front lens and I denotes the rear lens of the imaging lens. The imaging lens generally comprising an array of multiple lenses is incorporated in a lens-barrel (not shown) in a movable manner along the imaging optical path (hereinafter, referred to as an optical path) so that the focusing position can be adjusted, and the movable lens is linked to a driving motor. This configuration has been known widely, and the description thereof is omitted.

A driving circuit FM is connected to the motor of the focusing mechanism. The solid-state image pickup device J is placed at the image-forming plane of the imaging lens. In the solid-state image pickup device J, photo-electric transfer elements are aligned as many as pixels corresponding to the resolution, by which the formed image of the subject is converted to an electrical form. For example, a device known as a CCD comprises a charge layer that induces charges upon receipt of light, and a transfer layer that transfers the charges in the charge layer to the outside. A CCD control circuit J01 is connected to the transfer layer. In the CCD control circuit J01, a buffer memory to accumulate charges from the transfer layer, an amplifier circuit, and an analog-to-digital conversion circuit are incorporated. Hence, charges in respective pixels are converted from the transfer layer to the buffer memory according a signal from a reference clock.

The light quantity regulating device described above is formed in a unit and incorporated in a space between the front lens A and the rear lens I. Also, the shutter blade driving unit (driving meter) H is provided with a shutter driving circuit SH, and the iris blade driving unit (driving meter) G is provided with an iris driving circuit IR. These control circuits are linked to a CPU 100 that controls an overall camera apparatus, and each operation is controlled by the CPU 100. A release switch SW2 and a power switch SW1 are connected to the CPU 100 for transmitting the signals.

An Operation will be described with reference to FIG. 6. When a power switch of the camera is turned ON (ST01), the CPU 100 starts to supply power to the respective driving components. For example, in a camera provided with a liquid crystal display screen, a backlight of the liquid crystal display is ON. The solid-state image pickup device J transfers the induced charges to an image processing circuit and further to the display screen. For the shutter blade member E and the iris blade member C in the light quantity regulating device in this instance, power is not supplied to the electric conducting coils H03 and G03 of their respective driving units H and G (the same condition when the power switch SW1 stays OFF). Under these states, the shutter blade member E is present at the open position, and the iris blade member C is present at the retracted position. Light from the subject is thus imaged in the solid-state image pickup device J, which is then displayed on the display screen.

Monitoring (ST02) is performed as the image of the subject is displayed on the display screen concurrently with the apparatus power manipulation (ST01). The user then manipulates a mode selection switch to select whether the shooting is executed in a state being displayed on the monitor (moving-image shooting mode) or the shooting is executed in a still-image state (still-image shooting mode) (ST03). When the user selects the still-image shooting mode (referred to as one-frame shooting mode), a release operation is performed while confirming the monitor display or the subject through the finder.

When the power switch SW01 is turned OFF without performing the release operation, all the operations are completed. Hence, the power supply stops and the shooting is terminated (ST04). To perform the release operation, the shutter button is manipulated and depressed half-way down (ST05). The CPU 100 then starts to drive the motor FM by a signal generated from the manipulation, and the focusing operation is performed to adjust focus. At the same time, the CPU 100 computes an adequate quantity of light for exposure from a quantity of light received at the CCD, and determines whether the iris blade is to be used or not. When the shutter button is manipulated and depressed fully (ST06), the CPU 100 sends a command signal to the iris driving circuit IR to supply the electric conducting coil G03 with power when the iris blade is to be used (shooting by slightly reducing an aperture).

Upon receipt of this signal, the iris driving circuit IR supplies the electric conducting coil G03 with a predetermined current, and a magnetic field induced from the electric conducting coil G03 starts to rotate the rotor G01. With the rotations of the rotor G01, the actuation pin G12 rotates the iris blade member C in a clockwise direction in FIG. 3(a), so that the iris blade member C moves from the position indicated by a phantom line to the position indicated by a hidden line until it abuts against the stopper (iris blade restricting unit) F09. The iris blade member C is then maintained in this state while a predetermined current is kept supplied to the electric conducting coil G03 (ST07).

After an estimated time for this operation by the iris blade member C, the CPU 100 sends a reset signal to the CCD control circuit J01. Upon receipt of the reset signal, the CCD control circuit J01 invalidates and resets image data stored in the buffer memory (ST08). When the resetting is completed, exposure is started and light from the subject undergoes photo-electric conversion in the charge layer of the CCD.

After a calculated predetermined time (exposure time), the CPU 100 sends a command signal to the shutter driving circuit SH to close the shutter. Upon receipt of this signal, the shutter driving circuit SH starts to flow a predetermined current through the electric conducting coil H03 of the shutter driving unit (driving meter) H. A current induced from the electric conducting coil H03 upon supply of the predetermined current rotates the rotor H01 in a counterclockwise direction in FIG. 3(b), so that the shutter blade member E moves from the open position indicated by a phantom line to the closed position indicated by a hidden line. This movement of the blade shuts light from the subject completely, and the exposure of the CCD is thus terminated (ST09).

The shutter driving circuit SH keeps flowing the predetermined current through the electric conducting coil H03 after the blade has moved to the closed position, and the magnetic field induced from the electric conducting coil H03 confers a force to rotate the rotor H01 in a counterclockwise direction. The shutter blade member E thus maintains a state that it abuts against the stopper (shutter blade restricting unit) F09 and stays still (ST10). Hence, if an external force, such as an impact, is applied from the outside in this state, the blade is held at the closed position.

The CPU 100 then sends a signal to the CCD control circuit J01 to end the exposure, and the charges charged in the charge layer of the CCD are therefore transferred to the image processing circuit via the transfer layer. Charges in the respective pixels forming the CCD are transferred sequentially in the X- and Y-directions according to the scanning signals, under the control of the reference clock of the CCD control circuit J01. Hence, the data transfer time is determined depending on the characteristics of the CCD and the control circuit.

The CPU 100 thus supplies the electric conducting coil H03 with the predetermined current for a time (at least longer than the data transmission time) set in advance according to the data transmission time. When configured in this manner, the shutter blade member E is held in the state indicated by a hidden line in FIG. 3(b) (closed position). Light from the outside, therefore, will not reach the CCD during the process of data transfer (ST11).

After the predetermined time, the CPU 100 sends an operation end signal to both the iris driving circuit IR and the shutter driving circuit SH. Upon receipt of this signal, the iris driving signal IR starts to supply the electric conducting coil G03 with a current in the opposite direction, so that the iris blade member C shifts from the state indicated by a hidden line (actuated position) to the state indicated by a phantom line (non-actuated position) in FIG. 3(a) (ST12). The supply of the current is stopped after this operation is completed. Then, the rotor G01 in the iris blade driving unit G is attracted to the notched (slit) portion formed in the yoke G04 due to a magnetic force induced by a permanent magnet, so that the iris blade member C abuts against the stopper F08 and stays still (ST13).

Likewise, the shutter driving circuit SH starts to supply the electric conducting coil H03 with a current in the opposite direction, so that the shutter blade member E moves from the closed position indicated by a hidden line to the open position indicated by a phantom line in FIG. 3(b) (ST14). When the electrical conduction to the electric conduction coil H03 is stopped under this state, the rotor H01 in the shutter blade driving unit H is attracted to the notched portion made in the shielding yoke H04. The shutter blade member E thus abuts against the stopper F07 and is thereby held at the open position. The light quantity regulating device returns to an initial state through these operations, and is ready for the following shooting operation.

In the operation described above, the iris blade and the shutter blade open and are closed by reversing the direction of the current supplied to the respective electric conduction coils. However, in a case where a spring (close spring) that confers a force in the retraction direction to the iris blade member C as well as a spring that confers a force in an open direction to the shutter blade member E are provided, the power supply is merely turned OFF without flowing a current in the opposite direction in ST12 and ST14. In this case, it is not necessary to provide the notch in the yoke of the driving meter for attracting the magnetic rotor in one direction. Operations other than specified above are the same as those described above.

As described in detail above, according to the invention, the shutter blade placed in the imaging optical path is held at the open position while the apparatus is not in use, and moves from the open position to the closed position when power is supplied to the exciting coil for driving the blade at a predetermined exposure end signal. Accordingly, the blade is held at the closed position by continuing to supply the driving current to the exciting coil while image data is converted from the solid-state image pickup device, and the shutter blade moves from the closed position to the open position after the image data has been converted. It is thus possible to achieve the advantages as follows.

The shutter blade is held at the open position while no current is flowing, and the blade moves to the closed position by flowing a current through the exciting coil when exposure ends after the predetermined monitoring followed by the release manipulation. This eliminates the need to keep supplying the driving current for the monitoring or the like, thereby reducing power consumption.

The shutter blade closed upon completion of the predetermined exposure is maintained in a state where a current is kept supplied to the exciting coil until the image data is transferred from the solid-state image pickup device to the outside. Hence, there is no risk that light from the outside enters, because the blade will not vibrate by an impact generated when the blade is closed, or the blade is opened by an impact applied to the camera apparatus from the outside.

Further, the electromagnetic driving device that drives the shutter blade does not need a hold mechanism to hold the blade in a non-conductive state at each of the open position and the closed position of the blade, thereby reducing a size and weight of the apparatus. In particular, when the electromagnetic driving device comprises a magnet rotor and an exciting coil wound around the periphery thereof, the magnetic or mechanical hold mechanism need not to be provided at two positions in a space where the coil is wound around, thereby reducing a winding area of the coil.

The shutter blade at the closed position is able to return to the open position smoothly and rapidly by stopping the driving of the exciting coil without a magnetic or mechanical force. This enables the shutter device to perform the following shooting operation rapidly for successive shootings or the like.

The disclosure of Japanese Patent Application No. 2004-061846 has been incorporated in the application.

While the invention has been explained with reference tot eh specific embodiments of the invention, the explanation is illustrative and the invention is limited only by the appended claims.

What is claimed is:

1. A light quantity regulating device, comprising:
   a substrate having an exposure aperture,
   a shutter blade disposed on the substrate for closing the exposure aperture at a closed position and opening the exposure aperture at an open position,
   a shutter driving unit having a first exciting coil for driving the shutter blade between the closed position and the open position,
   a blade restriction member disposed on the substrate for holding the shutter blade at the closed position,
   a shutter blade holding unit disposed on the substrate for holding the shutter blade at the open position while a driving current is not supplied to the first exciting coil,
   a control unit electrically connected to the shutter driving unit for controlling the same such that a driving current is supplied to the first exciting coil according to an exposure timing signal so that the shutter blade moves from the open position to the closed position, the driving current is supplied to the first exciting coil for a predetermined period of time so that the shutter blade is pushed against the blade restriction member, and the driving current is stopped after the predetermined period of time so that the shutter blade moves from the closed position to the open position,
   an iris blade disposed on the substrate and having an iris aperture smaller than a diameter of the exposure aperture,
   an iris driving unit electrically connected to the control unit and having a second exciting coil for driving the iris blade between an actuated position entering the exposure aperture and a non-actuated position retracted from the exposure aperture,
   an iris blade restriction member disposed on the substrate for holding the iris blade at the actuated position, and
   an iris blade holding unit disposed on the substrate for holding the iris blade at the nonactuated position when a driving current is not supplied to the second exciting coil, said iris driving unit being controlled by the control unit such that the driving current is supplied to the second exciting coil according to an iris actuation signal so that the iris blade moves from the non-actuated position to the actuated position, the driving current is supplied to the second exciting coil for the predetermined period of time so that the iris blade is pushed against the iris blade restriction member, and the driving current is stopped after the predetermined period of time so that the iris blade moves from the actuated position to the non-actuated position.

2. An imaging apparatus according to claim 1, wherein said exposure aperture has a diameter of 4 mm or less.

* * * * *